Aug. 22, 1961  C. VAN DER LELY  2,997,113
DEVICE FOR LIFTING OR DIGGING OUT TUBERS, BEETS
AND LIKE CROPS FROM THE SOIL
Filed June 27, 1957  3 Sheets-Sheet 1

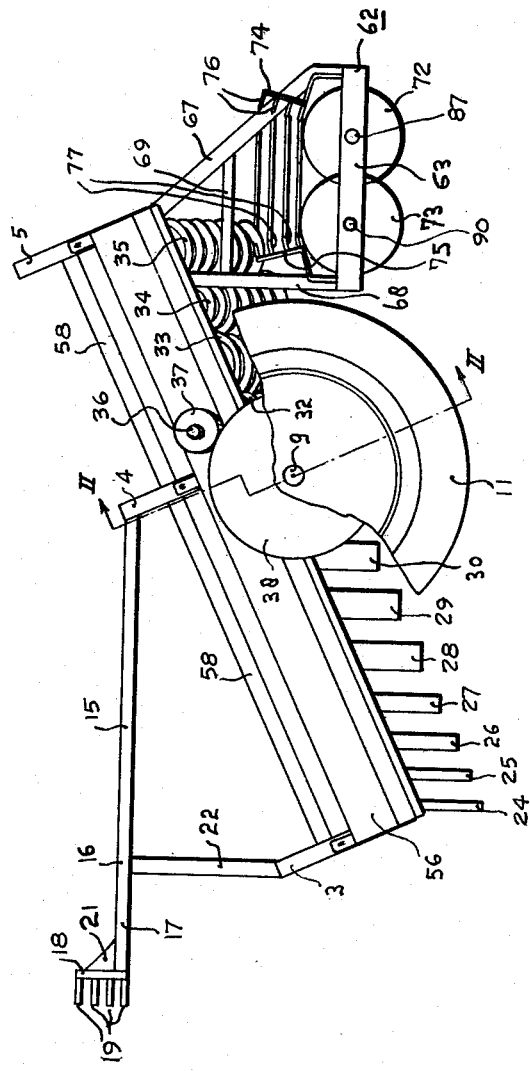

Aug. 22, 1961 C. VAN DER LELY 2,997,113
DEVICE FOR LIFTING OR DIGGING OUT TUBERS, BEETS
AND LIKE CROPS FROM THE SOIL
Filed June 27, 1957 3 Sheets-Sheet 3
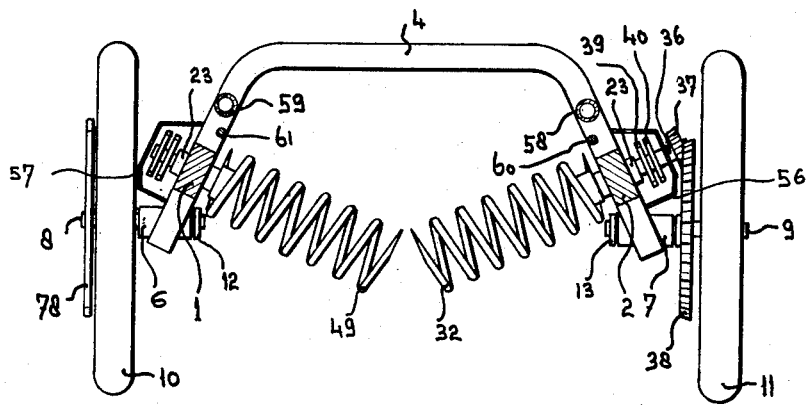
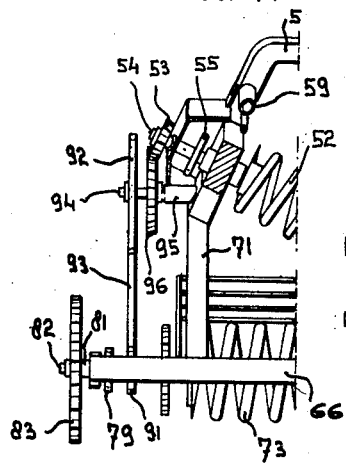
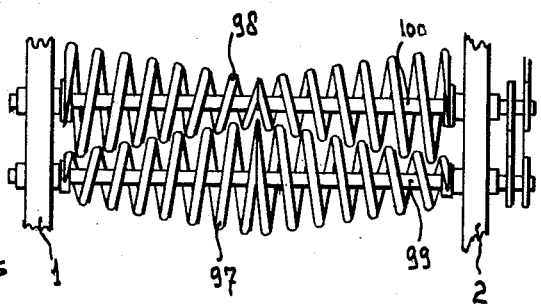

United States Patent Office 2,997,113
Patented Aug. 22, 1961

2,997,113
DEVICE FOR LIFTING OR DIGGING OUT TUBERS, BEETS AND LIKE CROPS FROM THE SOIL
Cornelis van der Lely, Maasland, Netherlands
(7 Bruschrain, Zug, Switzerland)
Filed June 27, 1957, Ser. No. 668,357
Claims priority, application Netherlands July 9, 1956
20 Claims. (Cl. 171—89)

This invention relates to devices for lifting or digging tubers, potatoes, beets and like crops from the soil, and more particularly to devices of the type comprising a frame embodying one or more lifting members mounted for rotation about their longitudinal axes.

An important requirement to be fulfilled by such a device is to provide a most favorable separation between soil and crop without causing damage to the crop.

In accordance with the present invention the or each lifting member is situated transverse to the direction of movement of the device. In this way it is possible to lift the potatoes or beets (which are mostly placed in rows) easily out of the ground, whereby at the same time a certain amount of the soil adhering to the crop may be removed. Moreover the device according to the invention may have an extremely large working width.

In accordance with one aspect of the invention, the free ends of two lifting rods are directed towards one another. It is thus possible to enclose completely between these rods that portion of the ground which contains the crop, so that it is not possible for the crop to remain in the ground.

It is desirable in this case that a lifting rod should be journalled only at one end, so that it is not necessary to force bearings for the lifting rods into the ground.

In accordance with a further aspect of the invention, it is advantageous to provide relatively different diameters for the lifting rods, the strip of ground containing the crop being thus worked in an advantageous manner, while the power required to move the device forward may be relatively small.

According to a further aspect of the invention, the device embodies rotatable helices, of which the peripheral part performs the lifting operation and transports the crop upwardly.

According to a further aspect of the invention, the center distance between two adjacent helices is smaller than the sum of the radii of the helices. Thus, the peripheral parts of the helices rotate locally one between the other, so that two adjacent helices clear away the earth one from the other. Moreover, the transport of the crop is enhanced, since the V-shaped cavities between the helices are less sharp.

In accordance with a further aspect of the invention provision is made for sorting or transporting tubers or beets, and, for example, means consisting of two transport helices rotating in opposite directions can be utilized, so that the crop may, if desired, be sorted during its transport towards one side of the device.

An advantageous solution is obtained by providing a retaining device at the top end of the transport helices, so that the crop can be readily delivered from the transport helices.

The invention will now be described more fully with reference to the accompanying drawings in which FIG. 1 is a plan view of an advantageous embodiment of the invention, which is particularly suitable for digging potatoes.

FIG. 2 is a side view taken in the direction of the arrow I of FIG. 1.

FIG. 3 is a sectional view taken on the line II—II of FIG. 2, the transport helices being not shown.

FIG. 4 is a sectional view taken on the line III—III of FIG. 1, and

FIG. 5 shows a further embodiment of a detail of the device shown in FIG. 1.

Figure 1:
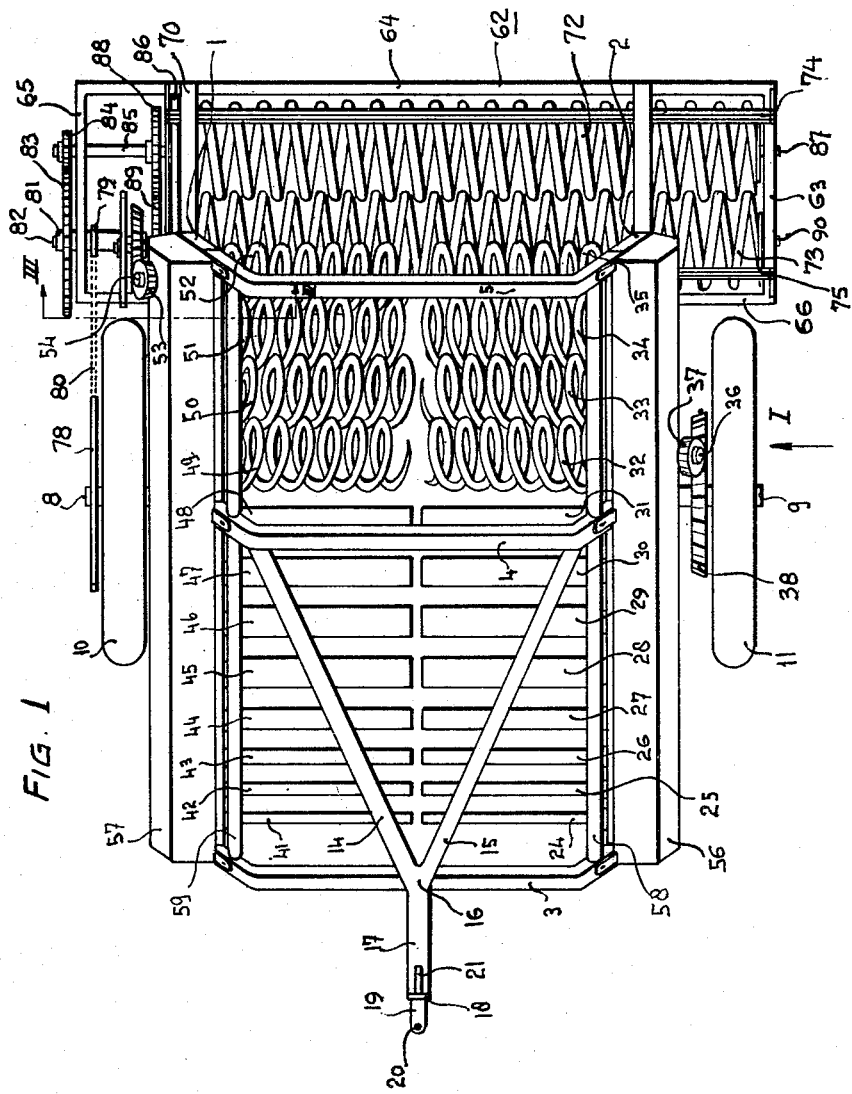

Referring to FIGS. 1, 2, 3 and 4, the device comprises two frame beams 1 and 2, which are connected with one another by three bows 3, 4 and 5 to constitute a mobile frame. To the frame beams 1 and 2 are secured bearings 6 and 7, in which shafts 8 and 9 are freely rotatable; running wheels 10 and 11 are mounted on these shafts. Rings 12 and 13 prevent the shafts 8 and 9 from shifting in the bearings 6 and 7.

To the bow 4 are secured stay rods 14 and 15, which connect at portion 16. At the portion 16, the stay rods 14 and 15 are secured to a rod 17, to which are fastened members 19 by means of a strip 18, these members each having a hole 20, by means of which the device can be drawn over the soil. The fastening of the strip 18 to the rod 17 is reinforced by means of a web 21. To the bow 3, a rod 22 is secured and this rod connects at portion 16 to the rod 17.

The frame beam 2 supports bearings 23 which support lifting rods 24 to 31 in rotatable manner. In bearings 23 are moreover journalled rotatable helices 32 to 35, the axes of which are so close to one another that the helices move partly within each other. The lifting rods 24 to 31 and the helices 32 to 34 are driven from the running wheel 11 and, to this end, shaft 36 of the helix 32 has seated on it a conical gear wheel 37 which is driven by a conical gear wheel 38 mounted on the shaft 9. The shaft 36 is furthermore provided with sprockets 39 and 40, which drive the lifting rods 24 and 31 and the helices 32 to 35 in such a manner that the rods 24 to 31 and the helices 32 to 35 rotate in the same direction and at the same circumferential speed.

The frame beam 1 is also provided with bearings 23, in which lifting rods 41 to 48 are rotatably journalled along with helices 49 to 52, which also rotate partly one in the other. The rods 41 to 48 and the helices 49 to 52 are driven from a conical gear wheel 53 mounted on the shaft 54 of the helix 52 by means of a sprocket wheel 55, which is also mounted on the shaft 54.

The driving gear of the lifting rods 24 to 31 and of the helices 32 to 35 is protected by a screening box 56, and the driving gear for the lifting rods 41 to 48 and of the helices 49 to 52 is protected by a screening box 57. The bows 3, 4 and 5 are connected with one another by tubes 58 and 59 and between these bows are provided rods 60 and 61 for a purpose hereinafter described.

To the frame beams 1 and 2 is connected a frame 62 which consists of beams 63, 64, 65 and 66. The frame 62 is conected with the frame beam 2 by rods 67 and 68 reinforced by a stay rod 69 and the frame 62 is connected in the same manner with the frame beam 1. FIG. 1 shows a rod 70 and FIG. 4 shows a rod 71 of this fastening arrangement.

In the frame 62 are rotatably journalled two transporting helices 72 and 73, which rotate partly one in the other. At the top end of the further helices 72 and 73 are provided upright grids 74 and 75, consisting of rods such as 76 and 77. The transporting helices 72 and 73 are driven from the running wheel 10 and to this end the shaft 8 has a sprocket wheel 78 which drives a sprocket wheel 79 by means of a chain 80. The wheel 79 is arranged on a sleeve 81 which is freely rotatable about a shaft 82 and is journalled on the frame beam 65.

On the sleeve 81 is arranged a gear wheel 83 which drives a gear wheel 84 connected with a shaft 85. The shaft 85 is journalled in the frame beam 65 of the frame 62 and in a frame beam 86 which connects the frame beams 64 and 66 with one another. To the shaft 85 is secured one end of the transporting helix 72, whereas the other end of the helix is secured to a shaft 87 which is journalled in the frame beam 63.

On the shaft 85 is a gear wheel 88 which drives a gear wheel 89 rigidly secured to the shaft 82 which is journalled by the sleeve 81 in the frame beam 65 and, moreover, in the frame beam 86. To the shaft 82 is secured one end of the transporting helix 73, whereas the other end of the helix 73 is connected with a shaft 90 journalled in the frame beam 63. By means of this drive of the transporting helices 72 and 73 from the wheel 10, the helices rotate in such a manner that the peripheral parts of the helices move away from one another, when viewed from above.

The conical gear wheel 53 is also driven from the wheel 10 and, to this end, the sleeve 81 has arranged on it a sprocket wheel 91 which drives a sprocket 92 by means of a chain 93. The sprocket 92 is connected with a shaft 94 which is journalled in a bearing 95 secured to the frame beam 1. On the shaft 94 is seated furthermore a conical gear wheel 96 which drives the conical gear wheel 53.

The device operates as follows:

During movement over a field, the lifting rods 24 to 31 and 41 to 48 rotate with a circumferential speed which substantially corresponds with the driving speed. The front rods, which penetrate more deeply into the soil will produce a furrow. Owing to the rotary movement of the rods, the soil is delivered from between the rods but the gaps between the rods are, however, such that the crop cannot be moved away from between them. The crop is raised by the successive, rotating rods and thus set free from the soil.

It is advantageous for the lifting rods to follow an oblique line rising upwards in the direction of driving so that the crop is readily lifted up from the soil. In order to obtain an advantageous application of the forces exerted on the lifting rods, it is efficacious to provide different diameters for the lifting rods, the rods in front having a smaller diameter than the rearmost rods. The front rods engage the solid soil and pentrate more deeply into the soil. A rod having a small diameter will not encounter any great resistance. The following lifting rods may have a larger diameter, since they engage the soil previously worked by the front rods and they penetrate less deeply into the ground.

The lifting rods are given a polygonal shape, for example a square cross-section, so as to engage the crop in an efficient manner, the crop being transported upwards by the rotation of the lifting rods. It is advantageous to coat the lifting rods with a shock-reducing material, so as to avoid the crop's being damaged during the operation of the device.

The helices 32 to 35 and 49 to 52 serve to elevate the crop from the lifting rods. The center lines of the helices are thus arranged at an angle to the horizontal so that the helices tend to move the crop upwards and effect a cleaning of the soil from the crop. It should be understood that although the crop tends to roll downwards due to the force of gravity, the crop will be carried upwards by the turns of the helices. It is also advantageous to vary the angles between the helices and the horizontal in order that the cleaning effect of the helices can be adapted to different operational conditions.

In order to prevent the crop from falling down from the transporting helices, provision is made of the rods 60 and 61 and as the helices rotate partly one in the other, a minimum adhesion of soil to the helices is insured. Moreover, the V-shaped cavities between the helices are thus less sharp, so that the crop is more readily raked over from one helix to the next one.

It is furthermore advantageous to vary the angle between lifting rods. Thus, the lifting rods can be introduced into the soil to a controlled depth and they can thus meet the requirements of different digging operations.

After passing the helices 32 to 35 and 49 to 52, the crop will traverse the transporting helices 72 and 73, which deliver the crop to one side of the device. The helices 72 and 73, which are rotated in opposite directions, have opposite pitches in order to deliver the crop to one side. If only one kind of pitch is used for the helices 72 and 73, only a crop of a size below a given measure will be separated.

Since the helices 72 and 73 rotate partly one in the other and, when viewed from above, in a manner such that the peripheries of the helices move away from one another, the crop will not be jammed between the helices, but will be urged against the grids 74 and 75 and be moved along these grids across the helices towards the side of delivery of the device.

By providing suitable conventional pawl structures between the shaft 8 and the chain wheel 78 and the shaft 9 and the conical gear wheel 38, for the purpose of transport, the driving gear of the lifting rods and the helices can be put into inoperative position. For transporting purposes, the device can then be fastened to a vehicle in a manner such that the device turns about the center lines of the shafts 8 and 9, the lifting rods thus being free from the ground.

Referring to FIG. 5, the helices such as 32 to 35 and 49 to 52 may be replaced by conical helices 97 and 98 which may be more suitable for improving the cleaning of particular crops. FIG. 5 shows shafts such as 99 and 100 journalled rotatably in the frame beams 1 and 2. These shafts are driven from a running wheel. The helix 97 has, at its ends, a small diameter, and has a larger diameter at its center, the pitch of one half being opposite that of the other half. The helix is driven in a manner such that the pitch tends to move the crop towards the ends, and this is supplemented by the large diameter at the center and the small diameters at the ends. The helix 98 has a small diameter at the center and a large diameter at the ends, while the pitch is also such that it tends to transport the crop towards the outer side. This effect is counteracted by the small diameter at the center and the large diameter at the ends, so that crop will be moved more towards the center. This shape for successive helices permits the crop to undergo an additional zigzag motion during its transport through the device, so that the cleaning of the crop is materially improved.

What I claim is:

1. A device for harvesting subterranean crop comprising a mobile frame having a normal direction of travel, running wheels coupled to the frame and supporting the same for ground traversing movement, and a plurality of digging rods rotatably mounted in longitudinally spaced relation on the frame and aligned obliquely to a horizontal plane transversely of said direction of travel, at least the foremost of said digging rods extending in part to a level lower than said running wheels.

2. A device as claimed in claim 1 wherein said digging rods are mounted on the frame in cantilever fashion and in pairs extending towards each other, the rods of each pair defining an angle therebetween and including free ends spaced from each other.

3. A device as claimed in claim 2 comprising helices on the frame in trailing relationship to said digging rods for receiving and cleaning the crop.

4. A device as claimed in claim 3 wherein the helices are positioned in pairs, the helices of each pair being mounted in cantilever fashion and defining an angle therebetween.

5. A device as claimed in claim 4 comprising further helices on the frame in trailing relationship to the first said helices and positioned relatively downwardly of the same for sorting and cleaning the crop.

6. A device as claimed in claim 5 comprising drive means coupled between the running wheels and the helices whereby the helices are driven by said running wheels.

7. A device as claimed in claim 5 comprising drive means coupled between the running wheels and the digging rods whereby the lifting rods are driven by the running wheels.

8. A device as claimed in claim 6 comprising shafts on the frame for supporting said further helices, the distance between the shafts being less than the sum of the radii defined by the helices whereby the helices are in meshed relationship.

9. A device as claimed in claim 6 wherein at least some of the lifting rods have different diameters.

10. A device as claimed in claim 6 wherein the angle between the digging rods of a pair is variable.

11. A device as claimed in claim 6 wherein the digging rods of each pair define a common vertical plane.

12. A device as claimed in claim 6 comprising coatings of shock-proof material on said rods.

13. A device as claimed in claim 6 wherein said further helices have varying diameters.

14. A device as claimed in claim 6 wherein the helices are in positions traversely of the direction of travel.

15. A device as claimed in claim 6 wherein the pairs of the first said helices occupy successively elevated positions.

16. A device as claimed in claim 6 wherein said further helices have opposite pitches.

17. A device as claimed in claim 6 wherein the uppermost peripheries of said further helices rotate away from each other.

18. A device as claimed in claim 6 comprising crop retaining devices on the frame adjacent the helices.

19. A device as claimed in claim 6 comprising a draw arm coupled to said frame.

20. A device as claimed in claim 6 wherein said further helices have a width exceeding that of the first said helices.

References Cited in the file of this patent
UNITED STATES PATENTS

| | | |
|---|---|---|
| 206,568 | Higgins | July 30, 1878 |
| 1,003,408 | Ainslie | Sept. 19, 1919 |
| 2,325,705 | Passa | Aug. 3, 1943 |
| 2,327,590 | Bower | Aug. 24, 1943 |
| 2,432,956 | Walz et al. | Dec. 16, 1947 |
| 2,441,244 | Kimball | May 11, 1948 |
| 2,463,019 | Clausen | Mar. 1, 1949 |
| 2,628,546 | Kempling | Feb. 17, 1956 |
| 2,747,354 | Bloser | May 29, 1956 |